J. T. PEDERSEN.
PUMP.
APPLICATION FILED SEPT. 15, 1909.
1,018,129.
Patented Feb. 20, 1912.
2 SHEETS—SHEET 1.
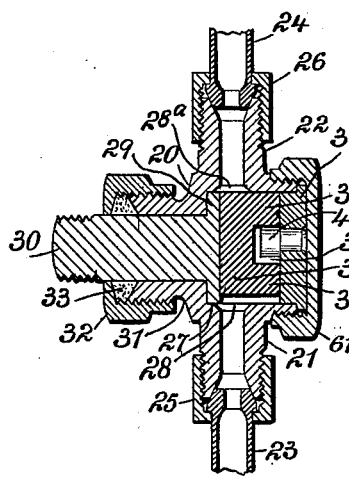
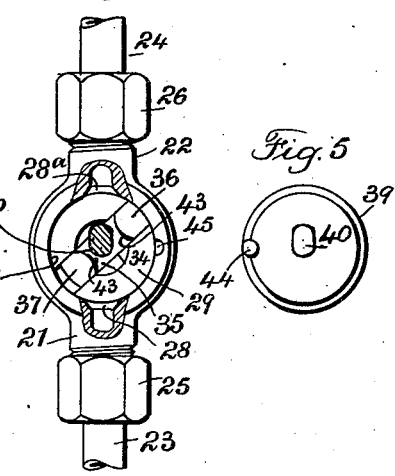
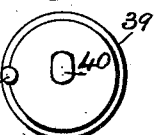
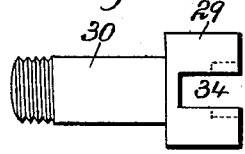
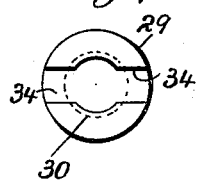
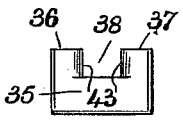
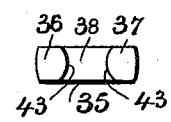
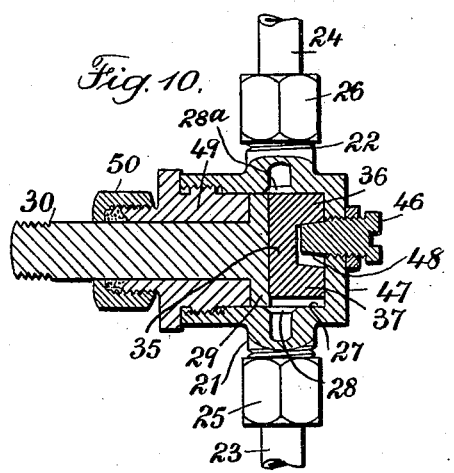
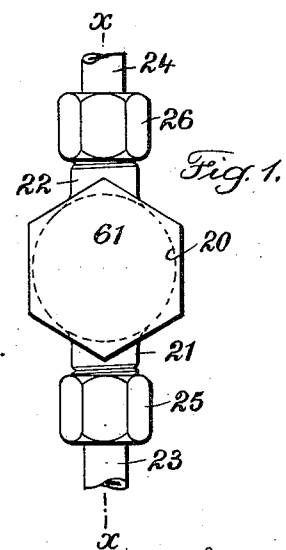
Witnesses
Chas. H. Smith
Inventor
Johannes Th. Pedersen.
by Harold Serrell
his Atty
COLUMBIA PLANOGRAPH CO., WASHINGTON, D. C.

J. T. PEDERSEN.
PUMP.
APPLICATION FILED SEPT. 15, 1909.
1,018,129.
Patented Feb. 20, 1912.
2 SHEETS—SHEET 2.
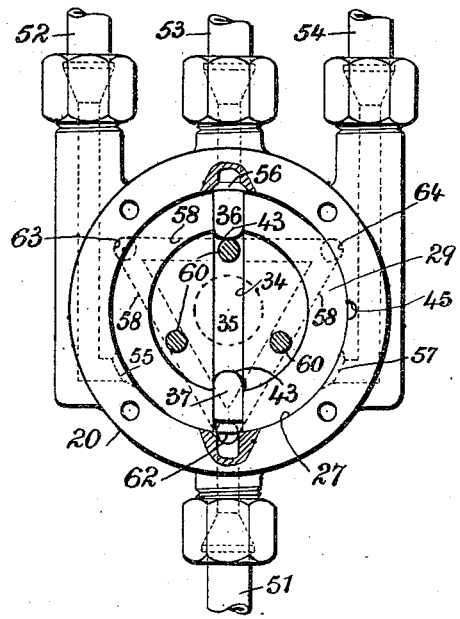
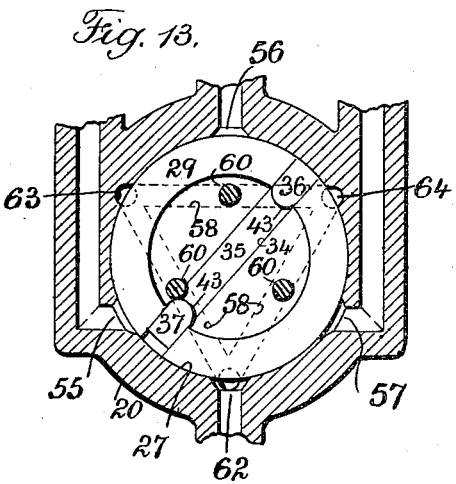
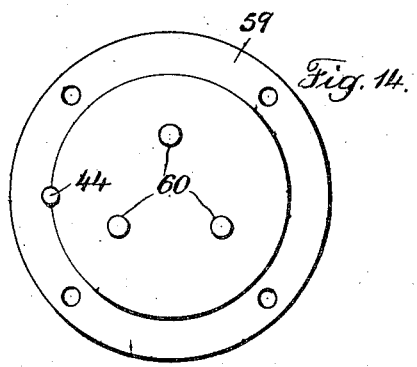
Witnesses
Chas H. Smith
A. H. Serrell
Inventor
Johannes Th. Pedersen,
by Harold Serrell
his Atty

UNITED STATES PATENT OFFICE.

JOHANNES TH. PEDERSËN, OF WOODSIDE, NEW YORK, ASSIGNOR TO PEDERSEN MANUFACTURING CO., OF NEW YORK, N. Y., A CORPORATION OF NEW YORK.

PUMP.

1,018,129. Specification of Letters Patent. Patented Feb. 20, 1912.

Application filed September 15, 1909. Serial No. 517,769.

*To all whom it may concern:*

Be it known that I, JOHANNES TH. PEDERSËN, a citizen of the United States of America, residing in Woodside, in the borough of Queens, city and State of New York, have invented an Improvement in Pumps, of which the following is a specification.

My present invention relates broadly to pumps and more particularly to a pump adapted for supplying oil or any other lubricant to the parts of a mechanism requiring lubrication, and while the pump according to my invention may be employed to lubricate the moving parts of any machine, it is particularly designed to be employed in the lubrication of motor vehicles, to be of simple construction, positive in action, to occupy a small space and to be of such small area that it can be placed in any convenient location between the source of supply of the lubricant and the parts to be lubricated.

In carrying out my present invention, I preferably employ a casing having inlet and outlet connections, a rotary member operative within the said casing, an ejector or piston member and means operative by and through the coöperation of the rotary member in the turning thereof to cause the said ejector or piston member to admit and discharge a quantity of the fluid to be handled by the pump during the revolution of the said rotary member, all of which will be hereinafter more particularly described.

In the drawing, Figure 1 is a front elevation of a pump in which the improvements embodied in my present invention are employed. Fig. 2 is a cross section on the line x, x, Fig. 1. Fig. 3 is a front elevation and partial section showing the cap removed and the ejector member in the suction and discharge position. Fig. 4 is a view similar to Fig. 3 showing the ejector member in an intermediate position. Fig. 5 is an inverted plan of the cover. Fig. 6 is a side view of the rotary member. Fig. 7 is an end view thereof. Fig. 8 is a side view of the ejector and piston member. Fig. 9 is a plan view thereof. Fig. 10 is a central vertical section and partial elevation illustrating a modified form of the invention. Fig. 11 is a central vertical section and partial elevation showing another modified form of the invention. Fig. 12 is a front elevation and partial section illustrating the form of invention shown in Fig. 11. Fig. 13 is a partial transverse section through the casing of the form of invention shown in Fig. 11, illustrating the suction and discharge ports and passages, and Fig. 14 is an inverted plan of the cover member employed in the form of the invention illustrated in Figs. 11, 12 and 13.

Referring to the drawings and particularly to Figs. 1 to 9 inclusive, in my improved pump I employ a casing made of any suitable material and of any desired configuration as indicated at 20. Extending from this casing preferably at diametrically opposite points there are inlet and outlet connections designated respectively at 21, 22. An inlet pipe 23 is suitably secured to the inlet connection 21 by means of the nut 25 or otherwise, and an outlet or discharge pipe 24 is secured to the outlet connection 22 by means of the nut 26 or otherwise.

Centrally the casing is preferably provided transversely thereof with a cylindrical aperture or bore 27 and the inlet and outlet connections 21 and 22 are provided with passageways terminating in the suction and discharge ports 28 28ᵃ through which communication is provided from the inlet connection to the said cylindrical bore 27 and to the outlet or discharge connection 22. I also employ a rotary member preferably comprising a cylindrical head 29 and a stem 30. The head 29 of the rotary member is adapted to fit and be revolved within the cylindrical bore 27 of the casing and the stem 30 of this rotary member passes through a bearing provided therefor in the extension 31 of the rear of the casing 20 and exteriorly thereof is screw-threaded for connection with any suitable means by which the rotary member may be turned. It will be understood that the manner in which the said rotary member is turned or is connected to the means by which it is turned, forms no part of my present invention. Passing over the outer end of the stem or bore member, I also prefer to employ a nut 32 adapted to be turned down on the screw-threaded exterior or the extension 31 of the casing 20 to engage the packing ring 33 provided between the head of the nut and the end of the extension 31 to form a tight joint and prevent the leaking of the apparatus at this point. Centrally and transversely the head 29 of the rotary member is provided with a recess or pistonseat 34, which as will be seen by particular reference to Figs. 6 and 7 extends entirely across the head 29.

35 designates an ejector or piston member adapted to fit and slide within the recess 34 in the head 29. The length of this piston member is materially shorter than the diameter of the head 29 of the rotary member and at either end on one side thereof the piston 35 is provided with arms or extensions 36 37 providing an intermediate recess 38.

39 designates a cover adapted to fit over an extension on the front of the casing 20 at the outer end of the cylindrical portion thereof within which the said cylindrical bore is provided. In a suitable position necessarily eccentric therein, this cover member is provided with a pin 40. This pin 40 extends from the inner face of the cover 39 into the recess 38 between the arms 36 and 37 of the piston 35 and may be secured in and to the cover 39 by means of an upset or riveted part which passes through the cover or otherwise and is adapted to be engaged by the curved adjacent faces 43 of these piston arms 36 37.

In a suitable position adjacent to the periphery thereof, the cover 39 on its inner side is provided with a positioning pin 44 adapted to enter a recess 45 provided therefor in the wall of the casing 20 in order that in assembling the parts the correct position of the pin 40 may be determined. In this form of the invention I also employ a cap 61 adapted to turn down on the screw-threaded exterior of the outer cylindrical portion of the casing 20 to maintain the cover 39 and the rotary member on the piston associated therewith in a properly assembled position.

In the operation of the hereinbefore described apparatus, it will be understood that the fluid to be supplied to any desired place may be taken from any convenient source and be conveyed to the inlet port 28 by way of the inlet pipe 23.

Assuming the parts to be in the position shown in Figs. 2 and 3, and the rotary member to be turning clockwise, the relation of the arms 36 and 37 and the pin 40 is such that the arm 36 having previously come into contact with the surface of the pin 40 has caused the piston to move in the turning of the rotary member to the position shown in those figures, wherein as will be apparent, a space or pocket will be formed between the outer face of the opposite end of the piston and arm 37 and the inlet port 28, permitting a quantity of the lubricant to enter. The piston has now been moved to the extreme of its stroke and as the rotary member continues to turn, it carries the piston with it, passing to and through the position shown in Fig. 4, whereby the lubricant which is permitted to enter the space or pocket between the piston and the inlet port, will be confined between this end of the piston, the wall of the cylindrical bore and the adjacent walls of the recess in the head 29 of the rotary member and will be conveyed as the rotary member turns, from the inlet port to the outlet port, and as will also be apparent, before the rotary member has been turned a half revolution, the curved face of the arm 37 of the piston will come into contact with the surface of the pin 40, thereby moving the piston in the opposite direction and also to the extremity of its stroke in this direction so that when the half revolution has been completed, the lubricant contained in the pocket as aforesaid, will be ejected into the discharge port 28$^a$ and the piston will have simultaneously drawn a second and like quantity of the lubricant into the pocket at the suction side of the pump. It will also be understood that the curved surfaces of the arms 36 and 37 and the form of the pin 40 may be such that there will be little or no pressure on the lubricant contained in the pocket before the discharge port is reached, and to assist in accomplishing this object, the walls of the cylindrical bore at the entrance of the suction and discharge ports may be flared or broadened in any suitable manner as shown in the sectional figures of the drawing.

Referring to Fig. 10, it will be seen that I may employ in lieu of the pin 40 hereinbefore described, a pin 46 the position of which relatively to the arms of the piston is adjustable. This pin 46 may be provided with a suitable head and a screw-threaded shank adapted to pass through the front or obverse side 47 of the casing, which in this instance may be solid or integral with the other portions thereof; the pin at its inner end 48 being tapering or conical and the inner faces of the arms 36 37 of the piston being tapered at a corresponding angle, so that as will be understood, by varying the position of the pin 46, the length of the stroke of the piston or ejector may be regulated and adjusted. In this construction the rear or reverse side of the casing is provided with a cylindrical portion adapted to receive a coupling 49 through which the stem of the rotary member passes and on the extremity of which a nut 50 is employed, together with a suitable packing ring to form a tight joint between these parts.

By reference to Figs. 11 to 14 inclusive, it will also be apparent that it is within the nature and scope of my present invention to so construct the apparatus as to supply independently any desired number of parts to be lubricated from a common source of supply, or single suction end of the apparatus. In these figures 51 designates the suction pipe and 52, 53 and 54 several discharge pipes, and while for convenience I have illustrated three discharge pipes, it will be understood that any desired number may be employed.

The discharge ports for the respective discharge pipes are indicated at 55, 56, and 57 and the suction port 62 leading from the suction pipe 51 to the interior of the cylinder is connected with the suction ports 63, 64, by means of a series of triangularly disposed ducts or passageways 58; these suction ports being placed intermediate and midway between the several discharge ports. The cover 59 provided in this construction of the pump, is provided with a series of pins 60 extending from the interior surface thereof, and like the pin 40, the pins 60 are adapted to contact with the inner faces of the arms of the piston to reciprocate the same by and through the coöperation of the rotary member in the turning thereof. In this form of the invention as it will be understood, the ejector or piston is reciprocated twice in each revolution of the rotary member for every independent discharge connection which is employed, and it will be manifest that the rotary member may be turned in either direction and will cause the pump to operate as efficiently in one direction as in the other.

I claim as my invention:

In a pump, the combination with a casing having a cylindrical bore and inlet and discharge openings of small area, of a revoluble member comprising a head and stem fitting the bore of the casing and the head transversely slotted in the outer face, a solid piston comprising a base with a substantially flat back and arms at the ends at right angles to the base and the outer parts of which are at the respective ends of the piston, with the inner faces outwardly inclined so that there is produced between the arms a recess and the piston transversely slidable across the face of the head of the revoluble member in the slot thereof and moving therewith, a cover to the casing contacting with the face of the revoluble member and a tapering adjustable member secured in said cover off the axial center of the revoluble member for actuating said piston to feed the fluid handled by the pump.

Signed by me this 9th day of Sept. 1909.

JOHANNES TH. PEDERSĚN.

Witnesses:
ARTHUR H. SERRELL,
E. ZACHARIASEN.

Copies of this patent may be obtained for five cents each, by addressing the "Commissioner of Patents, Washington, D. C."